United States Patent [19]
Warren

[11] Patent Number: 5,569,110
[45] Date of Patent: Oct. 29, 1996

[54] INTEGRATED HYDRO-MECHANICAL AUTOMOBILE TRANSMISSION

[76] Inventor: Walter S. Warren, 14 Chapman Road, Winnipeg, Manitoba, Canada, R2Y 1J8

[ * ] Notice: The term of this patent shall not extend beyond the expiration date of Pat. No. 5,203,747.

[21] Appl. No.: 387,194

[22] Filed: Feb. 13, 1995

Related U.S. Application Data

[63] Continuation-in-part of Ser. No. 905,334, Jun. 23, 1992, abandoned, which is a continuation-in-part of Ser. No. 774,555, Oct. 10, 1991, Pat. No. 5,203,747.

[51] Int. Cl.⁶ ............................. F16H 47/04; F01C 21/16
[52] U.S. Cl. ........................ 475/72; 475/83; 418/21
[58] Field of Search ................................ 475/72, 83, 80, 475/143; 60/490, 491, 492; 418/21

[56] References Cited

U.S. PATENT DOCUMENTS

| | | | |
|---|---|---|---|
| 2,463,950 | 3/1949 | Carroll | 60/53 |
| 2,484,789 | 10/1949 | Hill et al. | 103/20 |
| 2,645,903 | 7/1953 | Elkins | 418/21 |
| 2,666,293 | 1/1954 | Vigneau | 418/21 |
| 3,345,885 | 10/1967 | Tschanz | 475/72 |
| 3,404,584 | 10/1968 | Trautmann | 475/72 |
| 3,665,788 | 5/1972 | Nyman | 475/72 |
| 3,842,694 | 10/1974 | Marlow | 477/69 |
| 3,890,360 | 6/1975 | Pruvot et al. | 60/431 |
| 4,082,013 | 4/1978 | Dornfeld et al. | 477/68 |
| 4,091,690 | 5/1978 | Miyao | 477/43 |
| 4,232,570 | 11/1980 | Gibson | 477/68 |
| 4,232,572 | 11/1980 | Ross et al. | 475/72 |
| 4,291,594 | 9/1981 | Baudoin | 477/39 |
| 4,353,272 | 10/1982 | Schneider et al. | 477/68 |
| 4,497,223 | 2/1985 | Maruyama et al. | 477/68 |
| 4,646,521 | 3/1987 | Netherlands | 60/491 |
| 4,680,986 | 7/1987 | Elsner | 477/6 |
| 4,991,465 | 2/1991 | Hurth | 477/155 |
| 5,203,747 | 4/1993 | Warren | 475/72 |

FOREIGN PATENT DOCUMENTS

| | | | |
|---|---|---|---|
| 2646380 | 11/1990 | France . | |
| 1085389 | 7/1960 | Germany | 60/490 |
| 58-46246 | 3/1983 | Japan . | |
| 8204599 | 6/1984 | Netherlands . | |
| 2163217 | 2/1986 | United Kingdom | 418/21 |
| 93/15338 | 8/1993 | WIPO | 475/83 |

*Primary Examiner*—Khoi Q. Ta
*Attorney, Agent, or Firm*—Adrian D. Battison; Murray E. Thrift

[57] ABSTRACT

This invention describes an integrated hydro-mechanical transmission having continuous, through zero, variability from maximum forward to maximum reverse and is intended for use in passenger cars and lighter-duty trucks. The integrated hydro-mechanical transmission is capable of achieving high levels of efficiency and lower product cost. The unit is hydrostatically based and is automatically responsive to ratio upshifting as engine speed increases and to downshifting in response to applied load. In addition, the unit is responsive to operator selected inputs for ratio change to accommodate either temporary or extended heavy-load situations.

20 Claims, 9 Drawing Sheets

INTEGRATED HYDRO-MECHANICAL AUTOMOBILE TRANSMISSION

CROSS REFERENCE TO RELATED APPLICATIONS

This application is a continuation-in-part of application Ser. No. 07/905,334 filed Jun. 23, 1992 and now abandoned which is a continuation-in-part of application Ser. No. 07/774,555 filed Oct. 10, 1991 now issued as U.S. Pat. No. 5,203,747 on Apr. 20, 1993 which describes an integrated hydro-mechanical transmission having continuous, through zero, variability from maximum forward to maximum reverse and is intended for use in heavy duty drive-wheel-steered applications. This application is also related to application Ser. No. 08/387,165, now pending, filed simultaneously herewith.

BACKGROUND TO THE INVENTION

1. Field of Invention

This invention relates to automotive power transmissions, and particularly to infinitely variable hydrostatic transmissions, integrated with mechanical power transfer in such a manner as to achieve lower levels of power loss than can be achieved with current hydrodynamically-based automatic transmissions.

2. Description of the Related Art

In the transmission of power from the engine to the drive wheels in typical automotive applications, some sort of transmission device is required to transmit the rotative motion from a primary power source to a power output at selective transmission ratios. The major difficulty in transmitting power from the primary power source, or engine, to the vehicle drive wheels is that the engine only has a capability of transmitting power, or torque, within a defined operating range above idle speed, whereas the vehicle drive wheel speed must go from zero to maximum. In other words, some mechanism is required such that torque from a rapidly rotating power source can initially be transmitted to a stationary load and thereafter be matched in ratios such that, at maximum engine speed, the vehicle will be travelling at the desired maximum speed.

Furthermore, the transmission device must be capable of being selected to a lower relative drive ratio whenever a heavier load is encountered as when accelerating, going up a steep hill or when pulling an attached trailer.

Historically, many different approaches have been taken to resolve the requirement of matching engine output RPM to the desired vehicle operating speed. The first, and most elementary, was the mechanical clutch and manual-shift transmission, wherein the transmission usually incorporated either three or four stepped gear ratios for forward speeds and one for reverse. Further and continued developments in automotive drive systems saw the introduction of a fluid, coupling, or torque converter, between the clutch and manual-shift transmissions to provide a limited degree of continuous variability and downshifting in response to applied load. Further evolution's of the automotive transmission saw the elimination of the clutch and replacement of the manual-shift transmission by means of automatically engaged clutch packs for each ratio. These clutch packs usually provided essentially the same number of distinct ratios as did the earlier manually operated clutch and transmission but were engaged automatically in response to engine speed and applied load.

The current automatic transmission, however, is, at best, a compromise and has never been able to match the manual clutch and transmission in the level of fuel economy achieved. Inventors, though, have long realized that the key to achieving a greater efficiency in power transmission is by means of a transmission having the characteristic of continuously variable drive ratios at output speeds ranging from zero to maximum in both forward and reverse. Most inventors have further realized that some sort of hydrostatic, versus hydrodynamic, means would likely be the key. To date, however, no method of hydrostatic drive has been able to achieve both the functional characteristics required in an automotive transmission as well as the desired levels of mechanical efficiency.

In Europe, some success has been achieved in deploying a continuously variable belt-drive transmission to achieve the desired functional characteristic of continuous variability as well as achieving levels of fuel efficiency matching that of the manual transmission. However, the variable belt-drive transmissions have not been capable of achieving sufficiently high levels of durability and have, thus, not been used in any except the very smallest of cars. While the continuously variable belt drive might appear to have some application in smaller-type vehicles, some method employing a hydrostatic, or combined hydrostatic and mechanical method, would appear to offer the most promise for general automotive use.

SUMMARY

U.S. Pat. No. 5,203,747 describes a continuously variable, through zero, hydro-mechanical transmission exhibiting a high level of theoretical efficiency. While having particular application in drive wheel steered and tracked vehicles, it is recognized that this transmission can also be used effectively in other automotive applications where the current automatic transmissions are employed such as automobiles and light duty trucks.

It was also mentioned in the cited patent application that, while the variability is continuous from maximum forward to maximum reverse, the range of travel in the reverse range does not have to be the same as that of the forward range. In typical automobile applications, a maximum reverse speed of approximately one quarter that of the maximum forward speed is desired, and this is easily achieved by selecting the pump and motor sizes accordingly.

In the mentioned patent, it was also stated that the described transmission also exhibited potential downshifting characteristics in response to applied load. While this capability is not advantageous in drive wheel steered vehicles, it is very desirable in other automotive applications. In this transmission, downshifting in response to applied load is sensed as a countervailing force on the input lever, tending to move it towards zero, or neutral. It should be mentioned, however, that this is an additive force in the reverse range and tends to upshift, rather than downshift.

While the continuous variability of this transmission would be highly desirable in an automotive application, some means must be provided so as to achieve a positive neutral position, rather than the continuous variability through zero which is desirable in a drive wheel steered application. As well, in order to emulate an automatic transmission for automotive applications, some means must be provided to upshift in response to increasing engine speed, and to permit 'kickdown' or momentary downshifting for passing.

The adaptations made to this transmission and described in the current patent application achieve all of these desired results and others not possible in conventional transmissions. Whereas, in current automatic transmissions, first, second, and drive ranges are achieved by limiting which bands can be engaged, in the transmission described herein, the operator can select from an infinite variation of ranges to compensate for engine performance, differing loads, head winds, etc. The variability in this transmission, thus, has two automatic sensing components—one for downshifting in response to applied load, and one for upshifting in response to engine RPM above idle. As well it has two operator selected inputs one a 'trim' selection for operator adjustment of the relative 'weights' of the two automatic inputs, and one input analogous to the 'kickdown' or passing mode in a conventional automotive transmission.

The described transmission potentially offers a much higher level of efficiency than does a current hydrodynamically based automatic transmission. In addition, it offers significantly improved operating characteristics. Since this transmission does not require the complicated hydraulic shifting circuitry required in a conventional automatic transmission, nor the more costly torque converter, it is expected to more closely match a standard manual shift transmission in cost rather than an automatic.

Along with this increased simplicity and lower initial cost would go increased reliability and reduced maintenance costs. Further, because there are no attendant frictional fluid losses, and wherein virtually all sliding friction losses have been eliminated, there would be no need for extra costly items such as a transmission cooler charge system, etc. Another advantage is that because there is no torque converter located between the engine and the transmission output gears, as is the case in a typical front wheel drive configuration with transverse engine mounting, the engine can be located closer to the vehicle centerline which is beneficial in tightly spaced engine compartments. While not a great amount, even this amount can be beneficial in tightly spaced engine compartments.

BRIEF DESCRIPTION OF THE DRAWINGS

In the drawings like characters of reference indicate corresponding parts in the different figures.

DESCRIPTION OF THE PREFERRED EMBODIMENTS

The attention of the reader is drawn to U.S. Pat. No. 5,203,747 held by the present inventor, the disclosure of which is incorporated herein by reference. The transmission in said patent is used as a basis upon which the modifications and additions outlined below have been made.

Figure 1:
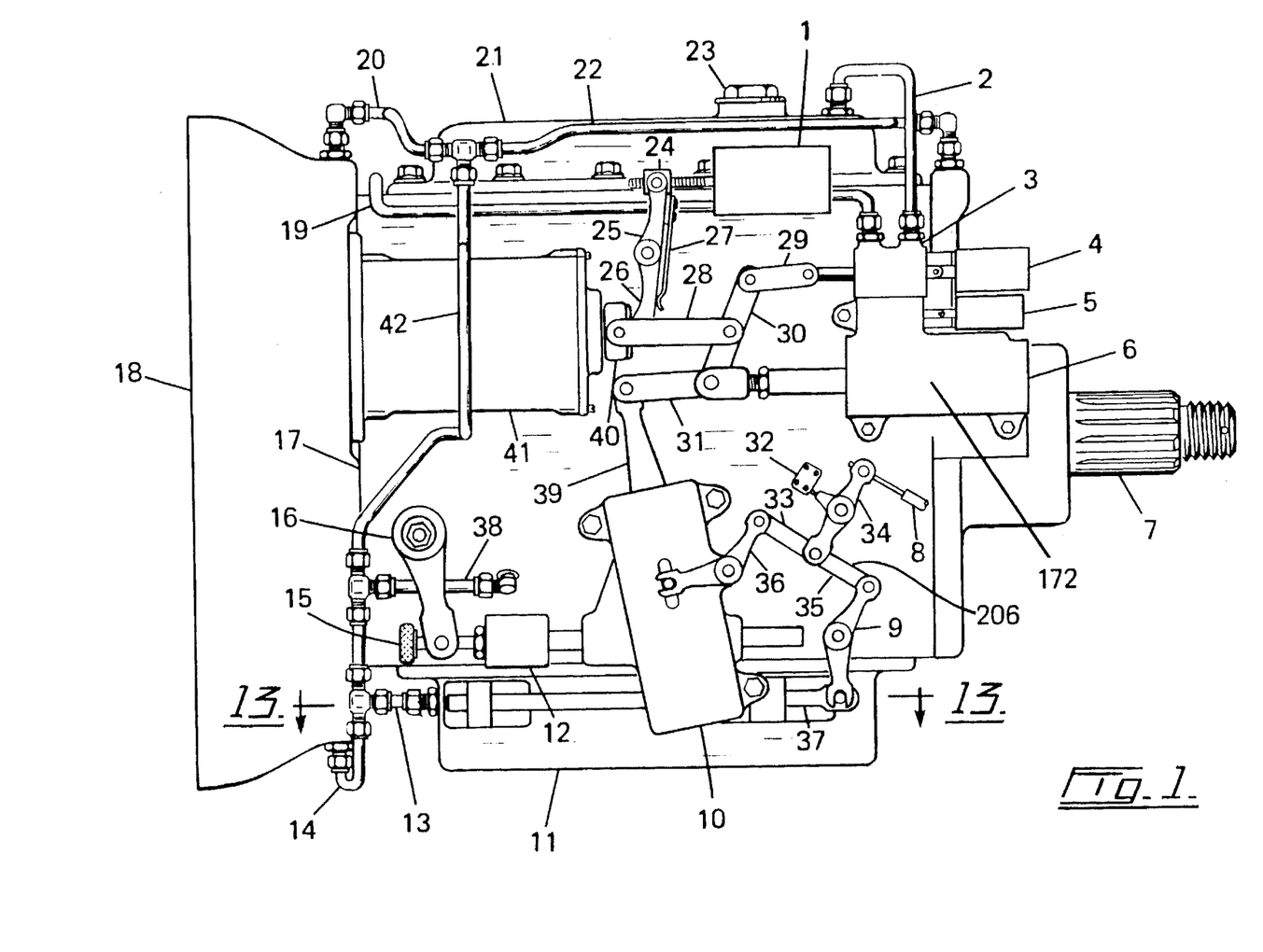
FIG. 1 is an orthographic side view of the transmission configured for a rear wheel drive automobile.
Figure 2:
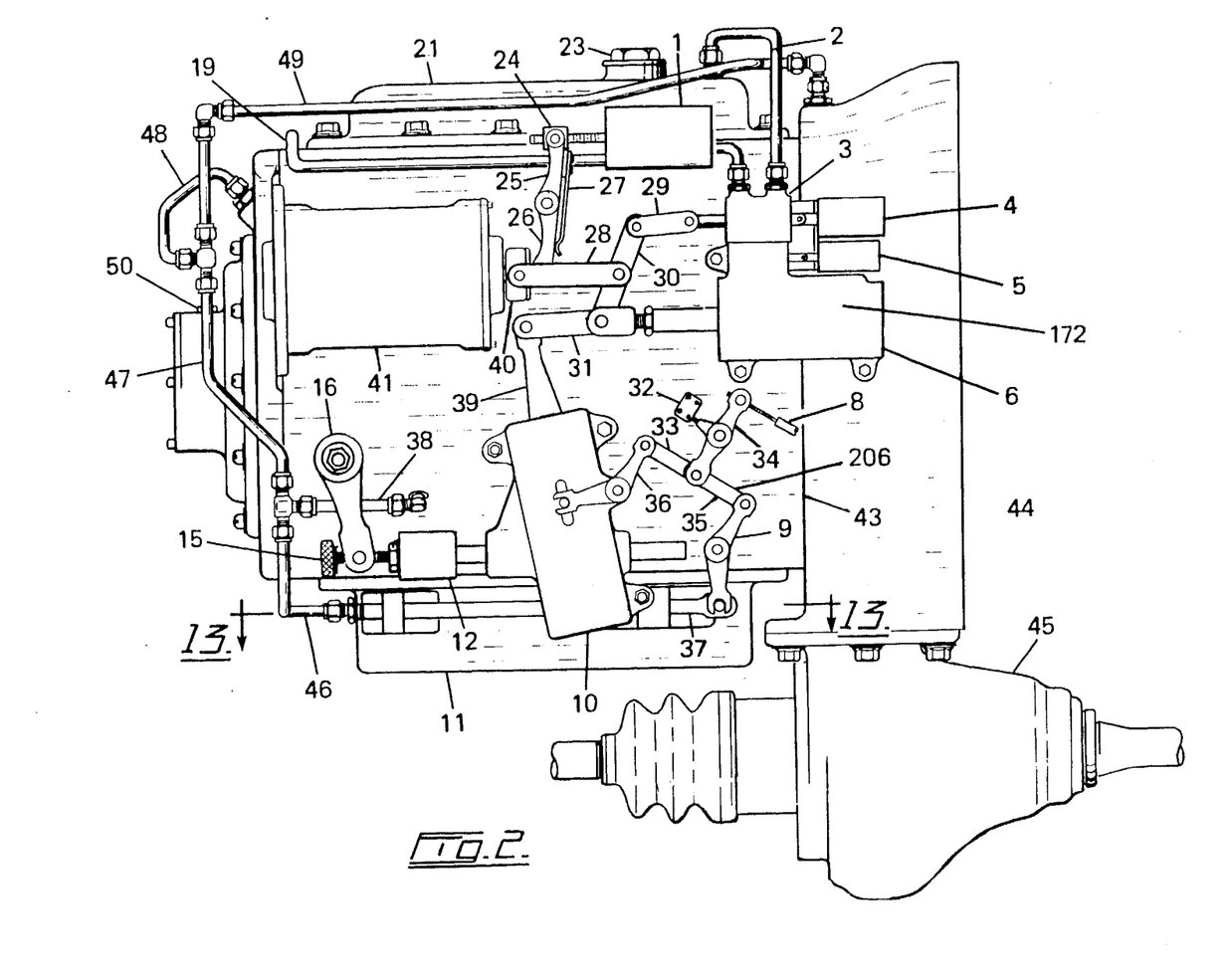
FIG. 2 is an orthographic rear view of the transmission configured for a front wheel drive automobile.

FIG. 1 illustrates the preferred embodiment of the transmission in a typical rear wheel drive automotive application, while FIG. 2 illustrates the transmission with transverse engine mounting in a typical front wheel drive application. Engine mounts have been added to both embodiments for front and rear wheel drive vehicles.

Referring to FIG. 1 the transmission attaches to the flywheel end of a typical engine by means of a housing 18, while the output shaft 7 mates with the vehicle driveshaft to transmit power to the rear drive wheels. In FIG. 2, a housing 44 attaches to the flywheel end of a typical transversely-mounted engine and item 45 is a typical front wheel drive differential. Identical externally mounted control mechanisms have been added to both embodiments of the transmission and are numbered the same in both FIGS. 1 and 2.

Figure 3:
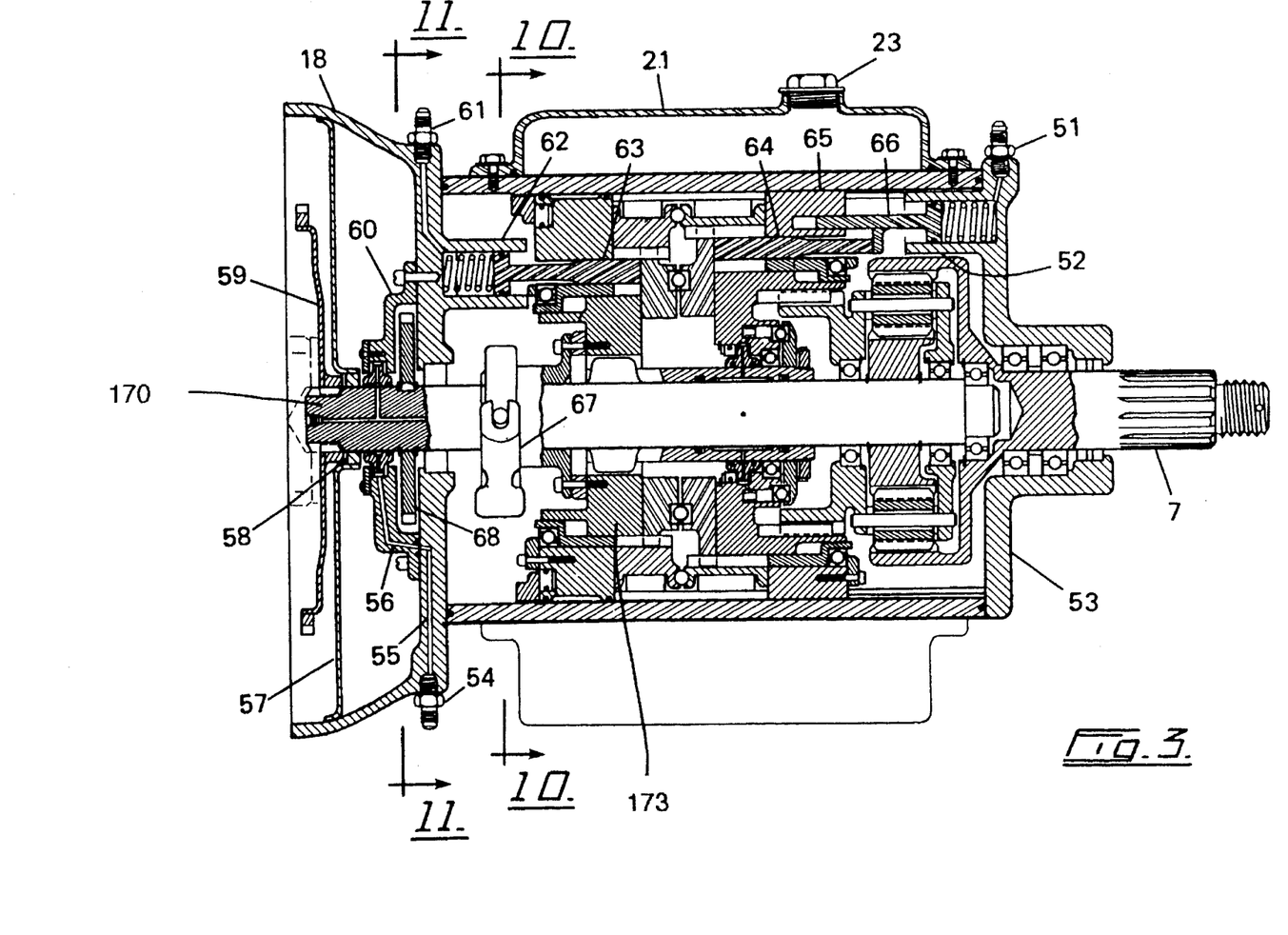
FIG. 3 is a cross sectional views taken through the centerline of the transmissions illustrated in FIG. 1.
Figure 4:
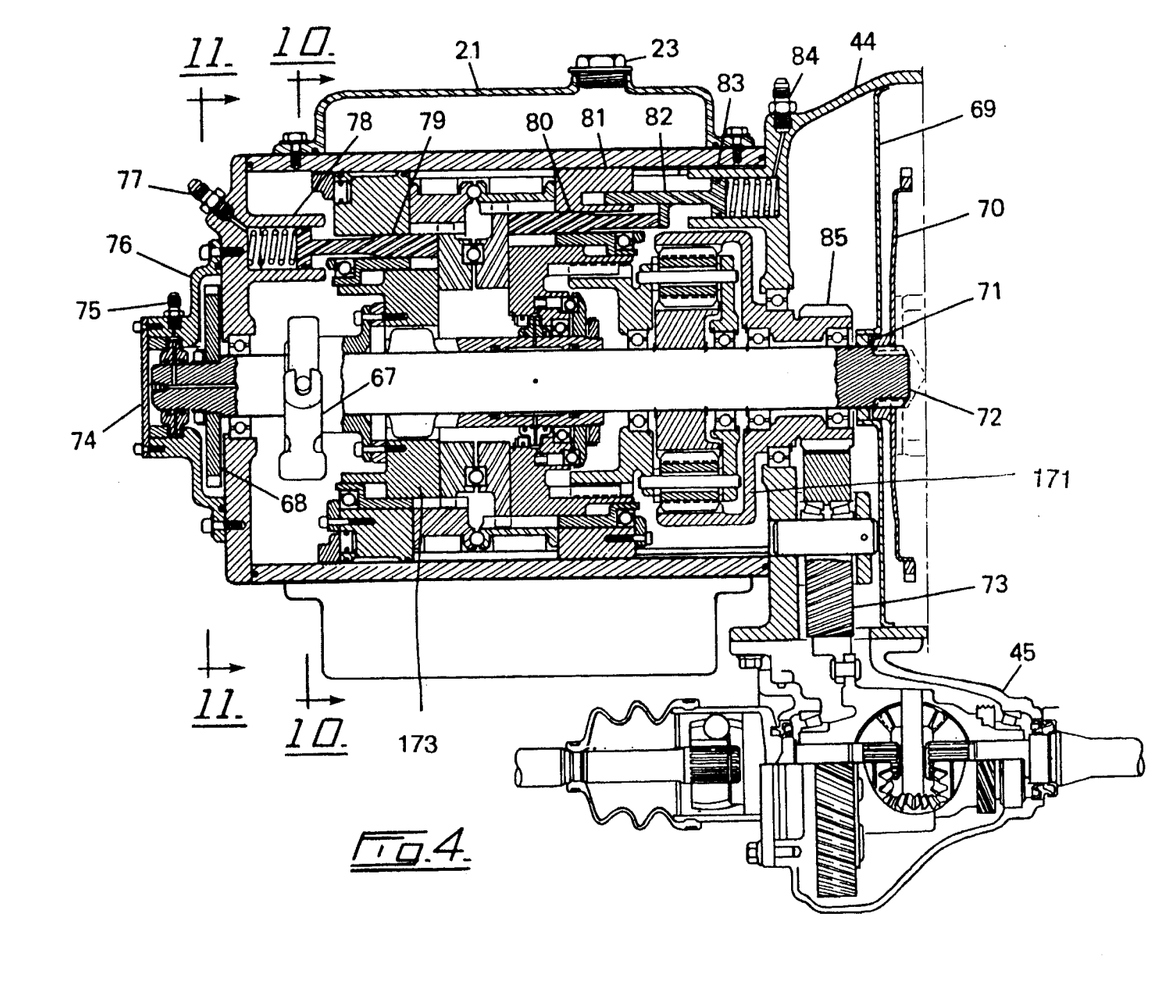
FIG. 4 is a cross sectional views taken through the centerline of the transmissions illustrated in FIG. 2.

Referring, next, to FIGS. 3 and 4, these figures illustrate the internal changes which have been made to the transmission to adapt it to automobile applications. Details of the engine mounts for both front and rear wheel drive vehicles are included.

Referring to FIG. 3, the engine bell housing 18 contains the engine flywheel 59, which is spline-coupled to the transmission input shaft 170. Also housed inside the engine bell housing 18 is a gear support housing 60 which serves to mount the forward portion of the input gear 131 for the shift control pump, the idler gear 130, and the input gear 129 for the speed sensor 41 see FIG. 11, which are driven via drive gear 68. The gear support housing 60 also serves to carry pressure balance fluid to the internal working elements of the transmission via fitting 54 and internal drillings 55 and 56. The aft portion of the engine bell housing is oil-bathed, and the oil is prevented from entering the engine flywheel compartment by means of baffle 57 and oil seal 58.

A further difference is that the pressure balance cylinders 62 and 52 for the hydraulic pump and motor crescents are moved inside the main housing in this application for the purpose of saving space. In the case of cylinder 52, the pressure balance piston 66 is made separate from the motor crescent 64 and the motor crescent is axially supported by means of a drilling in housing 65 in which it slides. In the case of integral crescent/piston 63, it is simply foreshortened from that shown in the aforementioned patent. Fluid to the crescent pressure balance cylinders is fed in via fittings 61 and 51 via piping 20 and 22 of FIG. 1.

FIG. 4 shows the mounting arrangement for the transmission in a front wheel drive configuration in which the engine is mounted transversely. In this case, it should be noted that both the input and output of the transmission are at the same end of the transmission. The engine bell housing 44 serves to mount the transmission on the flywheel end of the engine. The engine flywheel 70 is spline-coupled to the main drive shaft 72, and output from the transmission to the differential is by means of drive gear 85 and idler gear 73. Gear 85 is connected to the ring gear 171 and replaces the output shaft 7 in FIG. 3. Like all of the other internal components, gears 85 and 73 are oil-bathed, and oil is prevented from entering the engine flywheel chamber by means of baffle 69 and oil seal 71. The opposite or left hand end of the transmission is capped off by means of gear support housing 76 which is similar in function to that of housing 60 in FIG. 3, except that it incorporates an oil sealed end cap 74 and oil for the internal pressure balanced elements enters the transmission via fitting 75.

The hydraulic pump and motor crescent pressure balance cylinders 78 and 83 are also housed inside the main transmission housing, similar to that for the rear wheel drive transmission shown in FIGS. 1 and 3. Piston 82 is similarly offset from crescent 80 for purposes of mounting and is constrained axially in housing 81. Pressurized fluid for the hydraulic pump and motor crescent pressure balance pistons 79 and 80 is directed into the transmission via fittings 77 and 84.

FIGS. 1 and 2 also illustrate the hydraulic plumbing for the internal pressure balance circuits described in U.S. Pat. No. 5,203,747. The plumbing has been changed to accommodate changes in the location of some of the hydraulic components of the transmission. In FIG. 1, hydraulic pipes 13, 14, 38, 42, 20 and 22 serve to direct pressurized fluid from the hydrostatic circuits in the transmission to those elements requiring pressure balance. Hydraulic pipes 46, 38, 47, 48, 49 and 50 serve the identical function in FIG. 2. Identical hydraulic pipes 19 in FIGS. 1 and 2 serve to supply pressurized hydraulic fluid from the shift control pump 174 to selector valve 3 and to return fluid via hydraulic pipe 2 to reservoir 21. Fluid in the reservoir can be replenished by removing the filler cap 23.

Two control systems are employed to control the transmission, the ratio control mechanism which controls the input to output ratio of the transmission, and the transmission mode control mechanism which controls whether the transmission will operate in the forward, reverse, or neutral mode. These two control systems share some components so they do not operate completely independent of one another.

The ratio control mechanism as shown in the figures is responsive to the rotational speed of the transmission input shaft 170 and thereby engine speed. The ratio control mechanism comprises a speed sensor 41, a first linking means, a hydraulic servo actuator 172, a second linking means, a unidirectional spring dash pot 12, and a transmission input mechanism.

The speed sensor 41 has an input gear 129 meshed to and driven by drive gear 68 on the transmission input shaft 170 and has an output collar 40 which moves linearly in proportion to the rotational speed of the input gear 129. The output from the speed sensor 41 is a linear movement of collar 40. The speed sensor 41 is so designed that the output collar 40 only begins to move after the engine reaches a pre-determined speed above idle. Referring to FIGS. 1 and 2 the output from the speed sensor is towards the right as engine speed increases towards maximum from the set speed above idle.

The output of the speed sensor 41 is communicated to the hydraulic servo actuator 172 via the first linking means. The first linking means comprise links 28, 29, and 30 and link the speed sensor output collar 40 to the selector valve 3 input on the hydraulic servo actuator 172.

Positional displacement of the selector valve 3 by speed sensor output 40 via the first linking means results in a same-direction positional displacement of the piston and rod arrangement 108 of the hydraulic actuator 6. The positional displacement of the actuator piston and rod 108 is also felt as an opposite-direction input to selector valve 3, and this arrangement, in effect, makes selector valve 3 operate in conjunction with actuator 6 in such a way as to form a servo-actuator wherein the positional displacement of the piston 108 of actuator 6 is in direct proportion to the displacement of the output of the speed sensor 41. The hydraulic servo actuator 172 thereby amplifies the input of the selector valve 3 and produces output at the hydraulic actuator in the form of a same direction linear motion of the piston and rod arrangement 108. The piston and rod 108 is connected at its end to the second linking means.

The second linking means consist of link 31 and the forward reverse mode selector linkage 10 which connect the output of the hydraulic servo actuator 172 to the unidirectional spring dash pot 12. The unidirectional spring dash pot 12 is connected to the second linking means at one end and to the transmission input lever 16 at the other. The spring dash pot 12 allows movement in one direction only of the transmission input lever 16 during conditions of increased load on the transmission or during conditions of 'kickdown' for passing and the like.

The transmission input mechanism comprises a transmission input lever 16 which is connected to the spring dash pot 12 at one end, and an input control yoke 67 which is connected to the internal gear 173 of the hydraulic pump. The transmission input mechanism controls the position of the internal gear 173 of the hydraulic pump within the transmission and thereby the input to output ratio of the transmission. Movement of the spring dash pot 12 results in axial movement of the internal gear 173 of the hydraulic pump and thereby in a change in the input to output ratio of the transmission.

In addition current automatic transmissions incorporate a means to permit operator-selected operation at lower output ranges, 1st and 2nd in addition to the normal 'drive' range. Operator-selected downshifting to a lower output range is provided by the ratio trim control which is a small electric screw-type actuator 1 that operates in conjunction with pivot arms 25 and 26 and, leaf spring 27 to attenuate the output from the speed sensor 16. This will result in the engine operating at a higher RPM relative to vehicle speed throughout the full range. Unlike a conventional automatic transmission, however, the operator can select any of an infinite variety of ranges, simply by operating a thumb switch to increase or decrease the output range at will.

Figure 5:
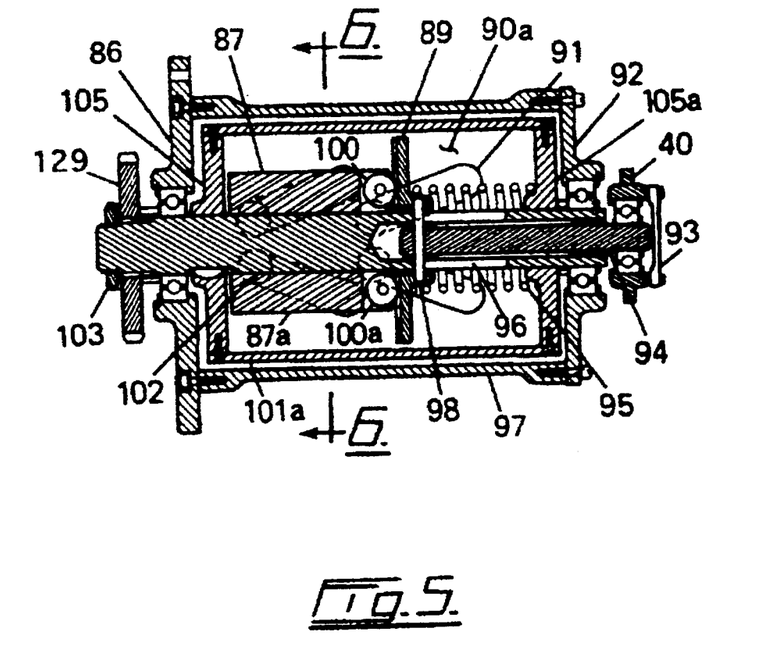
FIG. 5 is a cross sectional view of the speed sensor.
Figure 6:
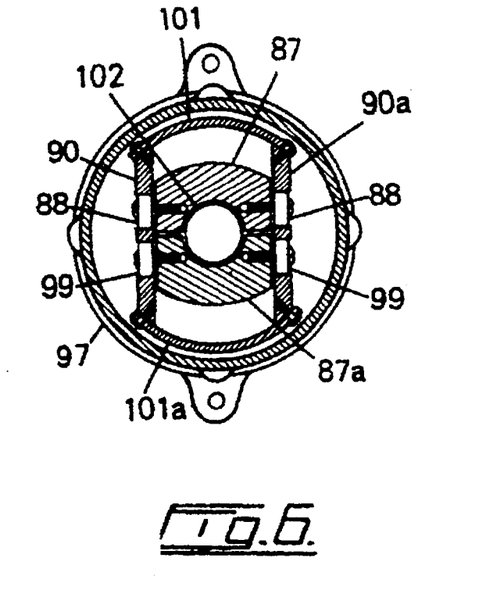
FIG. 6 is a cross sectional view taken along the cutting plane 6—6 in FIG. 5.

FIGS. 5 and 6 illustrate in detail the speed sensor 41, which is a simple rotary-type RPM sensor, but is designed so as to magnify the output. An input gear 129 is driven by drive gear 68 and idler gear 130 (see FIG. 11) and is spline mounted on a rotatable input shaft 102 and affixed in place by nut 103. The rotatable input shaft 102 is bearing mounted inside the external housing 97 by means of rear plate 92 and front plate 86, which also serves to mount the speed sensor onto the transmission. Inside the external housing 97 is a internal rotating housing consisting of identical front and rear end plates 105 and 105a, side plates 90 and 90a, and upper and lower plates 101 and 101a. Side plate 90 and 90a each incorporate two angulated cam follower guides 91 in which cam followers 88 and 99 ride. Flyweights 87 and 87a are constrained between plates 90 and 90a and are held in place radially by means of the cams 88 and 99 in such a way that they are effectively able to ride up the ramp against the force of compression spring 95 as the rotary speed increases. Cams 100 and 100a ride in a groove in compression plate 89 and serve to reduce any frictional distortions as the flyweights ride up the ramp. Compression spring 95 abuts against compression plate 89 and against end plate 105a which plates also form a seat for the compression spring. Compression plate 89 is solid bearing mounted on the rotatable input shaft 102 so that it is free to slide axially and is interconnected to push rod 94 by means of pin 98. Pin 98 rides in slots 96 cut into shaft 105. Push rod 94 is solid bearing mounted in an internal drilling inside shaft 102 such that it can move in or out axially. An output collar 40 is ball bearing mounted on push rod 94 and serves to connect the speed sensor output to the servo actuator. The end cap 93 serves to provide a smooth contact surface for arm 26 (see FIGS. 1 and 2) to abut against.

Figure 7:
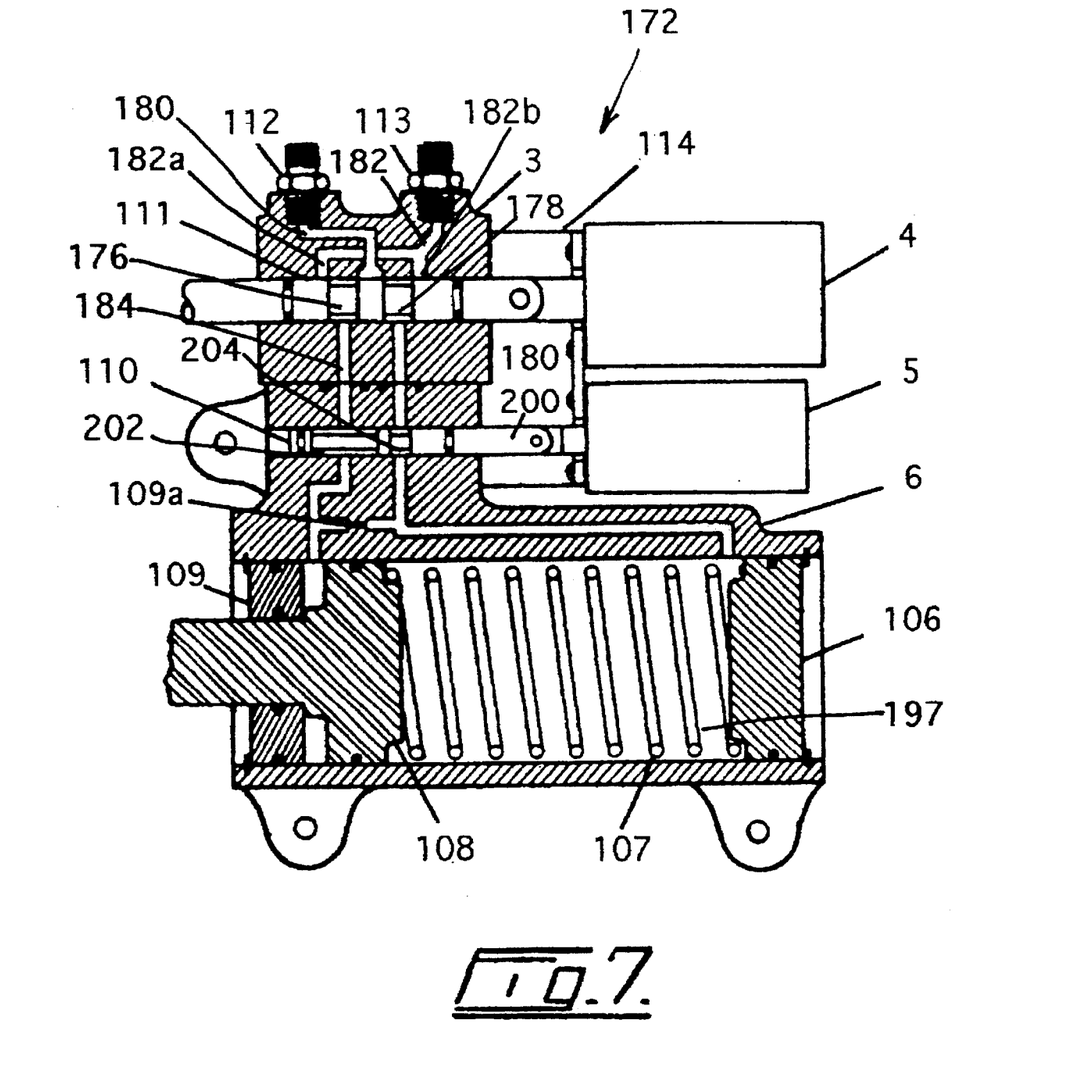
FIG. 7 is a cross sectional view of selector valve and servo-actuator.

FIG. 7 illustrates the main elements of the hydraulic servo-actuator 172 (see FIGS. 1 and 2) which functions to control the positioning of the transmission input lever 16 via the second linkage. The hydraulic servo-actuator 172 also has a servo actuator override which includes a shunt valve 110 and a solenoid 5, and a 'kickdown' solenoid 4 for down shifting under increased loading. Both solenoids 4 and 5 which are mounted onto the servo-actuator by means of bracket 114.

The hydraulic servo actuator 172 comprises a selector valve 3 and a hydraulic actuator 6. The selector valve 3 is capable of linear motion and is connected to the speed sensor output collar 40 by the first linking means. Movement of the speed sensor output collar 40 results in linear motion of the selector valve 3 which is then amplified and output by the hydraulic actuator 6 as same direction linear motion of a piston and rod arrangement 108 connected to the second linking means 31. A shift control pump 174 supplies pressurized fluid which varies with the transmission input speed to the selector valve 3. The shift control pump 174 is connected via hydraulic pipe 19 to the selector valve 3 for communication of the pressurized fluid therethrough.

The selector valve 3 comprises a high pressure fluid inlet 112, a low pressure fluid outlet 113, and a valve spool 111. High pressure fluid is directed to the hydraulic servo-actuator 172 from the shift control pump 174 shown in FIG. 12, via hydraulic pipe 19, and enters the hydraulic servo-actuator 172 via fitting 112. Fluid is returned to a reservoir via the low pressure outlet 113 and pipe 2.

A valve spool 111 passes through a hole running through the selector valve 3. The valve spool 111 is sealed at each end and the free to move axially within the hole. One end of valve spool 111 is linked to the output collar 40 of the speed sensor 41 such that the valve spool 111 moves in tandem with the speed sensor output 40. Located on and spaced a distance apart at points along the valve spool 111 are a first and a second annular valve recess 176 and 178.

The selector valve 111 includes four fluid paths for the communication of pressurized fluid within the hydraulic servo actuator 172. The first and second fluid paths 180 and 182 deliver fluid to and from the selector valve 3. The first fluid path 180 leads from the high pressure fluid inlet 112 to the valve spool 111. The second fluid path 182 leads from the low pressure fluid outlet 113 and branches into two lines 182a and 182b. The second fluid path 182 connects to the valve spool 111 at two locations spaced from and on either side of the first fluid path 180.

The third and fourth fluid paths 184 and 186 connect to the valve spool 111 on the opposite side of that of the first and second fluid paths 180 and 182 and carry fluid to and from the hydraulic actuator 6.

The valve spool 111 may move through a number of positions within the selector valve 3. A first range of positions align the valve spool 111 such that the first annular recess 176 will allow fluid to pass from the first fluid path 180 to the third fluid path 184 and the second annular recess 178 will allow fluid in the fourth fluid path 186 to flow to the second fluid path 182.

A second range of positions align the valve spool such that the second annular recess 178 will allow fluid to pass from the first fluid path 180 to the fourth fluid path 186 and the first annular recess 176 will allow fluid in the third fluid path 184 to flow to the second fluid path 182.

Fluid flowing from the selector valve flows to the hydraulic actuator via the third 184 and fourth fluid 186 flow paths. The hydraulic actuator 6 comprises a hydraulic actuator chamber 197, a piston and rod arrangement 108, a return spring 107, and a low volume bleed orifice 109a.

Piston and rod arrangement 108 is held inside the actuator chamber 197 by means of end plate 106 and 109. The hydraulic actuator chamber 197 is closed at one end by first sealed end plate 106 and has the return spring 107 located within the chamber 197 adjacent said end plate 106. The piston and rod arrangement 108 lies inside the hydraulic actuator chamber 197 adjacent the return spring 107 such that the rod projects outwards in a direction away from the spring 107 through the second sealed end plate 109 terminating externally to the hydraulic actuator chamber 197. Both the end plug to cylinder surfaces and the end plate to piston surfaces are O-ring sealed.

The hydraulic actuator chamber 197 is connected to the third fluid path 184 of the selector valve 3 at a location adjacent the second end plate 109 between the second end plate 109 and the piston and rod 108. The hydraulic actuator chamber 197 is connected to the fourth fluid path 186 of the selector valve 3 at a location adjacent the first end plate 106 between the first end plate 106 the piston and rod 108. Differential fluid pressure will cause the piston and rod arrangement 108 to move axially producing linear output motion providing hydraulic force to operate the transmission input lever 16 via the second linking means.

A low volume flow bleed orifice 109a connects the third 184 and fourth 186 fluid paths and serves to permit the actuator piston 108 to return to the neutral position when high pressure fluid is not applied. For example the return spring 107 will move the piston and rod 109 back to the neutral position when the engine is shut off or stalls. Output from the speed sensor 41 would normally act through the servo mechanism to return the piston and rod 108 to neutral as the engine returns to idle. In the event of an engine stall (no hydraulic pressure) the spring 107 serves in conjunction with orifice 109a to return the piston and rod 108 to neutral. In this instance, fluid is shunted from the left side of the piston, through orifice 109a to the right side of the cylinder.

Figures 11, 12, 13, 14:
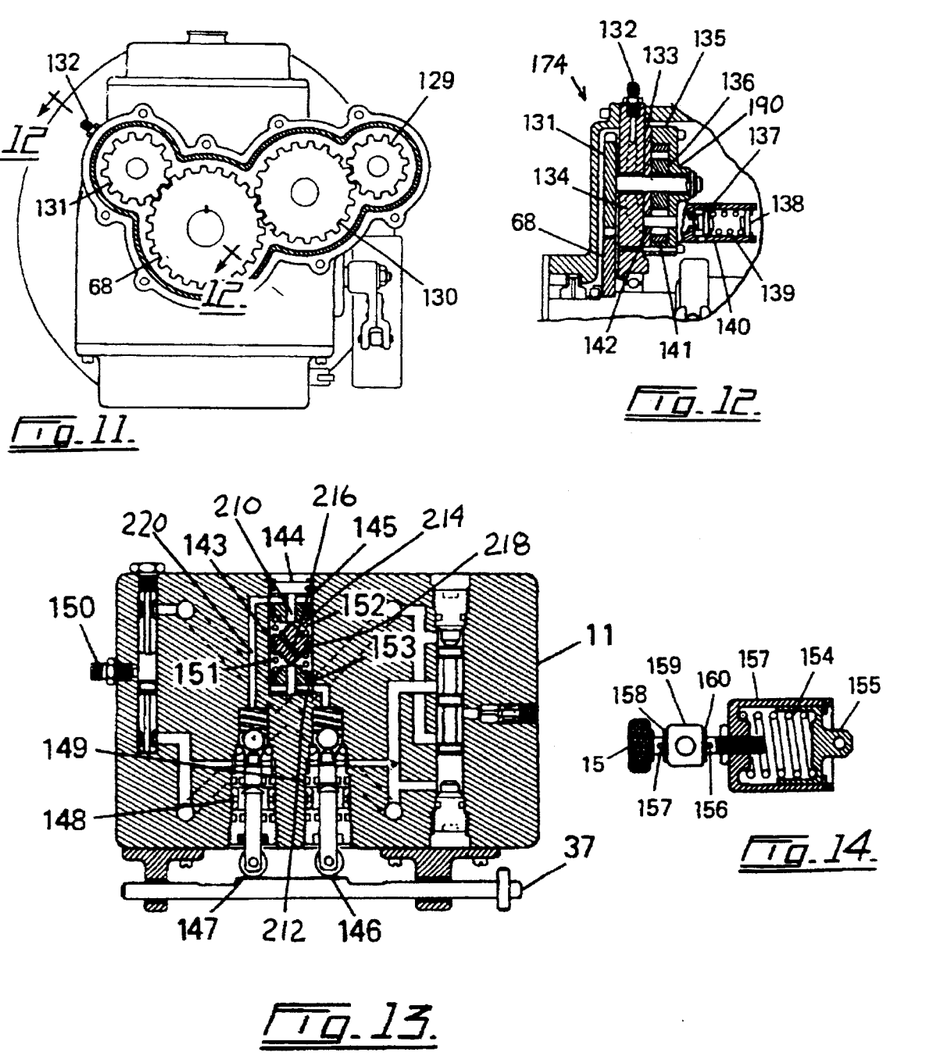
FIG. 11 are cross sectional views taken along cutting planes 11—11.
FIG. 12 is a partial cross-sectional view taken through cutting plane 12—12.
FIG. 13 is a cross sectional view of the mode selector assembly taken along cutting plane 13—13.
FIG. 14 is a cross sectional view of spring dashpot

The shift control pump 174 supplies pressurized fluid to the hydraulic servo actuator 172. Referring to FIG. 12 the shift control pump 174 is located inside the transmission housing and is immersed in hydraulic fluid. It comprises a miniaturized gear type pump 190, an external gear 131, and a pressure relief valve 140. FIG. 11 illustrates the drive gear arrangement for the shift control pump 174 and the speed sensor 41. Drive gear 68 drives the shift control pump input gear 131.

The miniaturized gear type pump 190 includes housing halves 133 and 135, an internal gear 136, an outer ring gear 141, and a crescent 142 that separates the respective internal gear 136 and outer ring gear 141. Pressurized fluid from the pump is directed via internal drillings 134 to a fluid flow outlet 132. The fluid flow outlet 132 is connected to external hydraulic piping 19, which directs the fluid to the hydraulic servo actuator 172. The external gear 131 is meshed with and powered by a drive gear 68 on the transmission input shaft 170. The external 131 and internal gear 136 are fixed to and spaced apart along a shaft. At the output side of the shift control pump is a pressure relief valve consisting of cylinder 140 which is connected to the pump casing, relief valve 137, compression spring 139, and spring seat 138. The pressure relief valve directs excess pressurized fluid flow to the main transmission housing rather than it being returned to the main reservoir.

An electrically activated kickdown solenoid 4 is connected to the selector valve 111 at the end opposite the first linking means, and to an operator selectable activating means preferably a switch located on the accelerator. Under normal circumstances the selector valve and actuator function as a servo-actuator; however, during 'kickdown' or rapid acceleration, as when the operator fully depresses the accelerator pedal, activation of the switch energizes the solenoid 4 which overrides the output of the speed sensor 41. This causes movement of the selector valve 3 into the second range thereby causing the selector valve 3 to change the high pressure fluid flow path. The change of fluid path reverses the action of the hydraulic actuator output resulting in transmission downshifting. As soon as the accelerator pedal is partially released, the solenoid is de-energized and normal operation is resumed.

The hydraulic servo actuator override serves to prevent the hydraulic servo actuator from generating output when the transmission is in neutral mode. With the transmission at neutral, the speed sensor continues to provide a positive output when the engine is 'revved up'. In this circumstance the output of the hydraulic servo actuator would attempt to move the input lever linkage even though the forward/reverse selector is constrained at neutral. To prevent this, the hydraulic servo actuator override is incorporated into the design and comprises a shunt valve 110 and an electrically activated shunt solenoid 5 as shown in FIG. 7.

The shunt valve 110 is located between the selector valve 3 and hydraulic actuator chamber 197 in line with the third and fourth fluid paths 184 and 186. The shunt valve 110 is an elongate member 200 which passes through a hole through the hydraulic actuator 6 and is sealed at each end. The shunt valve 110 is free to move axially in the hole. Two annular valve recesses a first and a second 202 and 204 are spaced apart along the elongate member 200. The first annular valve recess 202 is of a size large enough to connect the third fluid path 184 to the fourth fluid path 186. The electrically activated shunt solenoid 5 connects to the shunt valve 110 at one end and is actuated by a micro switch 32 connected to the mode select linkage 206. The micro switch 32 is closed when the mode select linkage 206 is in the neutral position.

When the electrical shunt solenoid 5 is not actuated the first valve recess 202 is in line with the third fluid path 184 and the second annular valve recess 204 is positioned in line with the fourth fluid path 186 allowing fluid to flow across the shunt valve 110 to the hydraulic actuator chamber 197. When the electrical shunt solenoid 5 is actuated the first annular valve recess 202 is in line with both the third and fourth fluid paths 184 and 186 thereby shunting fluid between the third and fourth fluid paths from the high pressure source to the low pressure reservoir bypassing the hydraulic actuator chamber, thereby resulting in no output for the hydraulic actuator.

FIG. 14 is a cross sectional view of spring dash pot 12 which serves to permit downshifting in response to applied load in the forward direction only. The spring dash pot 12 has an outer housing 157 which is closed at one end and open at the other. The housing 157 has flanges extending inwards at the open end and a threaded hole located generally centrally in the closed end. An inner member 155 fits within the outer housing 157 and is free to move axially within the outer housing 157. The inner member 155 is held inside the outer housing 157 by the flanges and is connected to the second linking means on its outside surface. The compression spring 154 is located within the outer housing lying between the closed end of the housing and the inner member 155. All components are arranged in such a way that the dash pot 12 can be compressed, but cannot be extended. An adjustable screw 15 is located in the threaded hole and has a pivotal connector 159 attached to it at a location external to the housing 157 which connects to the transmission input lever 16. The spring dash pot serves to interconnect output shaft 119 of the forward/reverse selector linkage 10 to the transmission input control arm 16 by means of the adjustable screw 15 and pivot connector 159. The pivot connector 15 is constrained on the screw 15 by means of washers 158 and 160 and pins 156 and 157.

Figure 10:
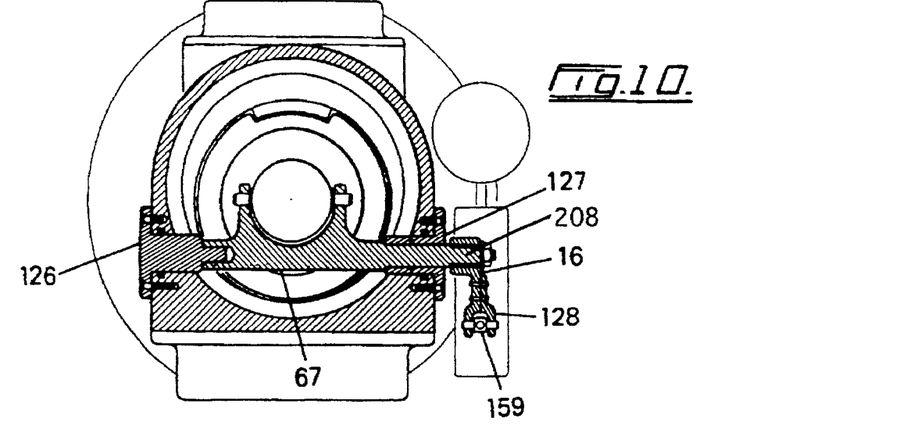
FIG. 10 is a cross sectional views taken along cutting planes 10—10.

FIG. 10 is a cross sectional view taken through cutting plane 10—10 showing the transmission input mechanism 208. The transmission input mechanism 208 comprises a control yoke 67 and a transmission input lever 16. The control yoke 67 is constrained axially within the transmission housing by pivot mounts 126 and 127. A splined shaft connected to the control yoke protrudes through the side of the transmission housing and is sealed to prevent oil leakage.

The transmission input lever 16 is connected to the unidirectional spring dash pot 12 at one end and to the splined shaft of the input control yoke 67 at the other. A riveted portion 128 for attachment to the pivot connection 159 of the unidirectional spring dash pot 12 (see FIG. 14) is incorporated on the transmission input lever 16. The transmission input lever 16 moves through a range of alternately selectable pivot points which correspond to forward and reverse vehicle ranges.

As the transmission input lever 16 is moved through its travel range in the forward or reverse directions the control yoke 67 is rotated pivotally such that rotation of the yoke will result in the hydraulic pump internal gear 173 being repositioned axially thereby increasing or decreasing the ratio of input speed to output speed.

The ratio trim control serves to allow operator adjustment of the transmission input to output ratio by countering the output of the speed sensor thereby changing the engine rpm at which up shifting will take place.

The ratio trim control comprises an electric trim actuator 1, and a compound lever. The electric trim actuator 1 is reversible and has a rotatable electric motor and an output screwshaft 24. The output screwshaft 24 is connected to a compound lever such that the compound lever will be repositioned in either a forward or backward direction when the electric motor is activated by means of an operator selectable toggle switch.

The compound lever includes two arms 25 and 26, a leaf spring 27, and a common pivot point. The a leaf spring 27 is located such that rotational movement of the arms relative to one another is opposed in one direction by the spring 27. One arm 25 of the compound lever is connectably linked by means of a nut mounted on the output screwshaft 24 of the electric trim actuator 1. The second arm 26 is held in position against the output collar 40 of the engine speed sensor 41. The arms 25 and 26 are arranged so that movement of the arm 26 in contact with the speed sensor 41 is opposed by the spring 27 in a direction of increasing speed sensor output, resulting in a transmission output ratio reduction of such magnitude as selected by the operator.

The second control system is the transmission mode selector mechanism which enables the operator to select the mode of operation of the transmission namely forward, reverse, or neutral. The transmission mode selector comprises a mode select linkage 206, a forward\reverse selector 10, a mode select slider link 37, the unidirectional spring dash pot 12, and the transmission input mechanism 208. The unidirectional spring dash pot and the transmission input mechanism have already been described above.

The mode select linkage 206 enables the operator to control the rest of the transmission mode selector mechanism. It comprises a push pull cable 8, and five interconnected links; a master link 34, first and second intermediate links 33 and 35, a forward/reverse selector link 36, and a mode select connector link 9.

The push pull cable 8 is connected to an operator controlled device at one of its ends, and is connected by pivotal means to one end of the master link 34 at its other end.

The master link 34 is an elongate member pivotally fixed to the transmission housing at a point between its two ends, and is fixed to the push pull cable 8 at one end and to the intermediate links 33 and 35 at its opposite end.

The first intermediate link 33 is an elongate member pivotally linked to the master link 34 at one end and to the forward/reverse selector link 36 at the other. The second intermediate link 35 is an elongate member pivotally linked to the master link 34 at one end and to the mode select connector link at the other.

The forward/reverse selector link 36 is an elongate member pivotally connected to the first intermediate link 33 at one end and to the pins 124 on each side of the forward\reverse selector 10 at the other end, and is pivotally fixed to the transmission housing at its center.

The mode slider connector link 9 is an elongate member pivotally connected to the second intermediate link 35 at one end and to the mode select slider link 37 at the other, and is pivotally fixed to the transmission housing at its center.

A micro switch 32 is connected to the master link 34 such that when the mode select linkage is positioned for neutral, the switch is closed thereby energizing the hydraulic servo actuator override.

The links are of such shape and dimensions that the mode select slider linkage 37 and the forward/reverse selector 10 are simultaneously repositioned into the correct locations for forward, reverse, and neutral operation when the push pull cable is actuated by the operator.

Figure 8:
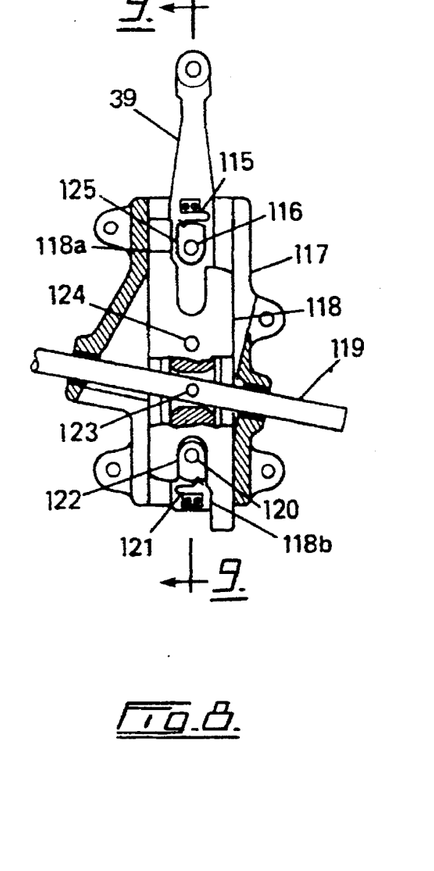
FIG. 8 is a cross sectional view of the transmission mode selector.
Figure 9:
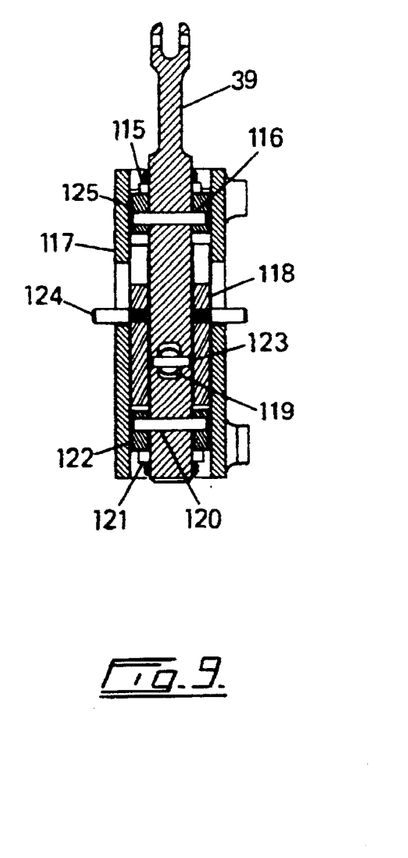
FIG. 9 is a cross sectional view taken along the cutting plane 9—9.

FIGS. 8 and 9 illustrate the forward/reverse selector which serves to convert the linear output of the hydraulic servo actuator 172 upon increasing engine speed to selective clockwise or counterclockwise rotational movement of the transmission input lever 16 in the forward and reverse ranges.

The forward/reverse selector 10 includes a housing 117 which is affixed to the transmission case, an inner sliding member 118 mounted inside the housing, an input lever 39 which pivots about either of two selectable pivot points, and an output shaft 119 which connects to the transmission input lever 16 via spring dash pot 12.

The input lever 39 is located within the housing 117 and is pivotally connected to the laterally moveable output shaft 119 and the inner sliding member 118. The input lever 39 has an upper trunnion 125 and the lower trunnion 122 each fixed to the input lever by pivotal connecting means 116 and 120 preferably lever pivot pins. The inner sliding member 118 is free to move generally upwards and downwards within the housing 117 and has trunnion cutouts with milled cutout portions 118a and 118b at each of an upper and a lower end. The trunnion cutouts 118a and 118b may be selectably engaged with the upper trunnion 125 for forward operation, with the lower trunnion 122 for reverse operation, and with both trunnions 125 and 122 for neutral operation. The trunnions 125 and 122 are held in position when not engaged by means of small leaf springs 115 and 121 to ensure that they remain in alignment for easy re-engagement. The milled cutouts serve to permit a small amount of over travel slightly into 'reverse' when forward mode is selected, and slightly into 'forward' when reverse mode is selected. Opposing pins 124, which screw into the inner sliding member 118 protrude, through two elongated slots in the housing and are spanned by and connected to lever 36 (see FIGS. 1 and 2).

The mode select slider link 37 engages the mode selector assembly 11 and comprises an elongate member with cams located on its surface which are in contact with cam followers 146 and 147 on the ball lifter mechanisms which control the non-return valves 148 and 149 within the mode select assembly 11. The cams are arranged such that lateral repositioning of the mode select slider 37 alternately holds unseated one or the other of said controllable non-return valves 148 and 149 for respective forward or reverse operation, or holds both non-return valves unseated for the neutral mode.

The hydraulic coupling means are as in U.S. Pat. No. 5,203,747 and comprise a first non-restrictive primary fluid flow crossover path connecting the pump outlet to the motor inlet, a second non-restrictive primary fluid flow crossover path connecting the motor outlet to the pump inlet and the mode selector assembly 11. The current invention includes the addition of a shuttle-stop valve arranged in the shunt path between the two non-return valves within the mode selector assembly.

To permit the desired 'freewheeling' at or near engine idle, but to ensure close coupling at higher speeds, a shuttle-stop valve 143 has been added. The shuttle-stop valve 143 comprises a first fluid path 210 and a second fluid path 212 a shuttle-stop valve chamber 214 a low volume fluid path 216, a first valve seat and a second valve seat 145 and 153 a first compression spring and a second compression spring 152 and 151 and a valve piston 218. The first fluid path 210 connects at one end to the first fluid path 220 of the first non-return valve 148 and connects to the shuttle-stop valve chamber 214 at its other end. The second fluid path 212 connects at one end to the first fluid path 222 of the second non-return valve 149 and connects to the shuttle-stop valve chamber 214 at its other end. The first and second fluid paths 210 and 212 enter the shuttle-stop valve chamber 214 at opposite ends from each other. The first and second valve seats 145 and 153 are located within the shuttle-stop valve chamber 214 adjacent the first and second fluid paths 210 and 212 respectively to control fluid flow into and out of the shuttle-stop valve chamber. The first and second compression springs 152 and 151 are located within the shuttle-stop valve chamber 214 inwardly of and adjacent to the first and second valve seats 145 and 153 respectively. The valve piston 218 lies between the first and second compression springs 152 and 151 biased away from both valve seats 145 and 153 by the compression springs 152 and 151. The low volume fluid path 216 is a small cross drilling in the valve piston 218 which connects the first fluid path 210 and the second fluid path 212 through the valve piston 218. This small cross-drilling in the shuttle valve permits a low volume of fluid flow through the valve when the engine is at or near idle. At higher fluid flow volumes, the fluid force on the valve piston overcomes the centering force of compression springs 151 or 152, biasing the piston into a seated position. Once the piston has moved the maximum amount possible, it blocks off any further fluid flow, effectively operating as a non-return valve. Valve seats 145 and 153 mate with valve 143 when it is abutted against them, and serve to direct fluid into internal drillings which interconnect with valves 148 and 149. Item 144 is an end cap which retains the valve components in the housing.

Figure 15:
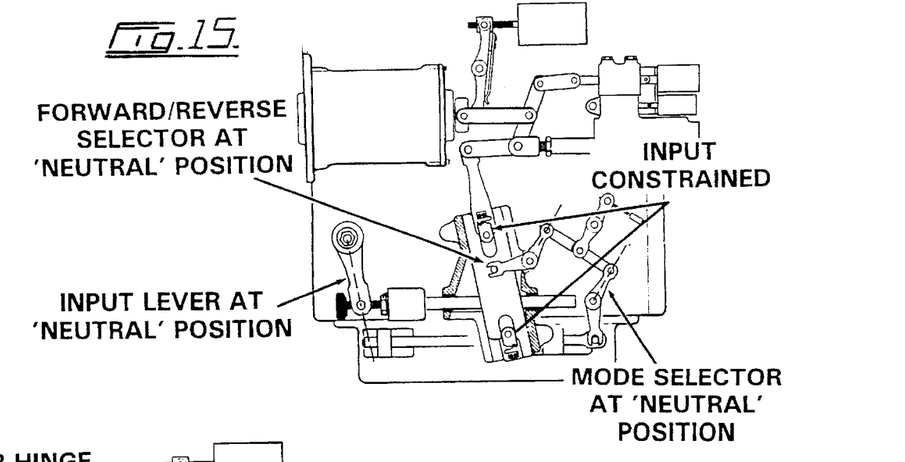
FIG. 15 is a mechanical schematic drawing illustrating the positional displacements of the control linkage elements in the neutral position.
Figure 16:
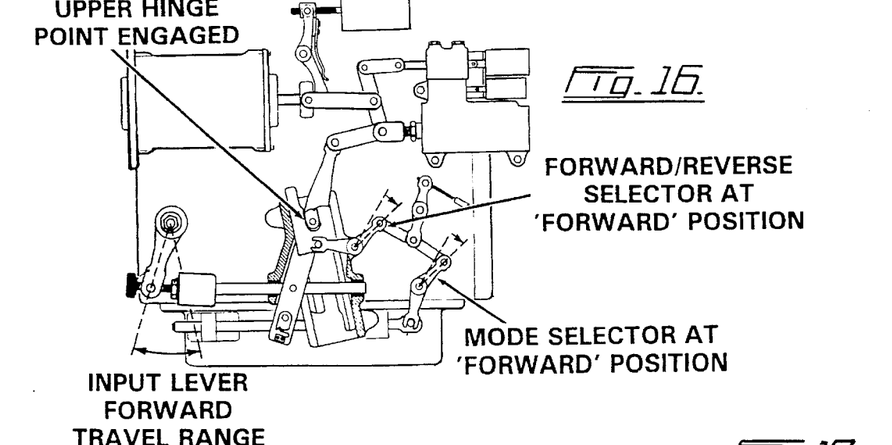
FIG. 16 is a mechanical schematic drawing illustrating the positional displacements of the control linkage elements in the forward position.
Figure 17:
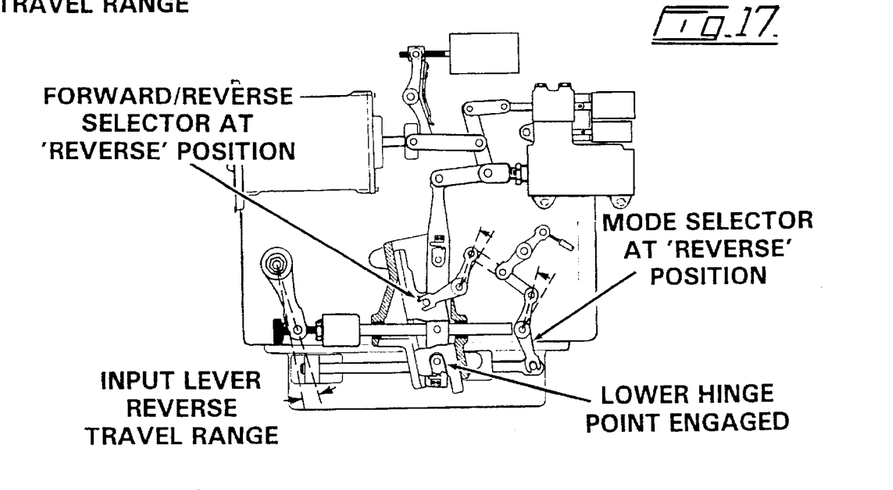
FIG. 17 is a mechanical schematic drawing illustrating the positional displacements of the control linkage elements in the reverse position.

FIGS. 15 through 17 schematically illustrate the transmission mode selector mechanism at 'neutral', 'full forward' and 'full reverse' respectively.

At the 'neutral' position, the forward/reverse selector linkage 10 is constrained by the engagement of both trunnions 124 and 122, thereby holding the transmission input lever in the neutral position as shown in FIG. 15. At the same time, the mode select slider 37 is at the neutral position, holding both non-return valves 148 and 149 in the mode select assembly 11 open. As well, the closed contacts of micro switch 32 cause solenoid 5 to be energized which, in turn disables the hydraulic servo actuator. Thus, if the engine is revved up, or if the vehicle is moving, the transmission remains fully disengaged.

When the forward/reverse selector is moved to the 'forward' position, the upper trunnion 125 point is engaged as shown in FIG. 16. With the upper trunnion 125 engaged and acting as a hinge point, the input lever 39 will travel in the 'forward' range is as shown. As well, the mode select slider holds the non-return valve 148 open and the non-return valve 149 closed. Thus, if the engine is at or near idle and the forward/reverse selector 10 is positioned slightly into the reverse' range, the transmission will, in effect, freewheel by bypassing a small amount of fluid via shuttle-stop valve 143 and non-return valve 148. As soon as the engine speed increases, and the fluid flowing through valve 143 increases, the fluid restriction caused by the larger volume of fluid flowing through the orifice causes the valve to be repositioned, effectively blocking off any further fluid flow and causing the engine and drive wheels to be close-coupled thereby supplying power to the wheels.

When 'reverse' is selected, the lower trunnion 122 is engaged and acts as the hinge point for the forward/reverse selector linkage as shown in FIG. 17. Note that, in 'reverse', the fulcrum point of the lever is much less than in 'forward', which results in a lower range of travel in reverse, and effectively overcomes any tendency in the transmission to downshift in response to applied load. In all other respects, the function of the control mechanism is similar to that in forward, except that freewheeling action within the mode control assembly is in the opposite direction.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A hydro-mechanical transmission comprising a transmission housing, a hydraulic pump, a hydraulic motor, an input shaft, a sun and planetary gear set, and an output shaft wherein;

the transmission housing encloses the hydraulic pump, hydraulic motor, and sun and planetary gear set, and includes a first opening such that the input shaft extends through said first opening in the housing, and a second opening such that the output shaft extends through said second opening in the housing;

the hydraulic pump and motor each are of the internal gear type arranged in a back to back configuration with respect to one another, and each includes an internal gear, an external gear and a crescent that separates the respective internal gear and external gear, the internal gears being capped off by laterally constrained and rotatably supported internal gear plugs, and the external gears being laterally constrained and capped off by external gear plugs positioned between the two internal gears creating respective pump and motor working chambers, the internal gears and associated external gear plugs are laterally moveable by a control shaft which is displaceable in an axial direction causing the internal gears to engage a greater or lesser portion of the respective external gears such that the volumetric capacity of both pump and motor working chambers are made inversely variable to one another, and wherein the hydraulic pump and hydraulic motor each has an inlet and an outlet coupled by hydraulic coupling means;

the sun and planetary gear set comprises a sun gear, planet carrier, planet gears, and ring gear being arranged such that the planet carrier is coupled to the internal gear of the motor;

the input shaft is coupled to the internal gear of the pump such that the internal gear of the pump is free to move axially, and is coupled to the sun gear such that the sun gear rotates at the same rate as said internal gear;

the output shaft is connected to the ring gear of the sun and planetary gear set so as to transmit the output of the transmission mechanically in the form of rotary motion.

2. A hydro-mechanical transmission according to claim 1 wherein the sun and planetary gear set has ratios which in conjunction with the relative volumetric capacities of said hydraulic pump and motor elements achieve a continuously variable, through zero output.

3. A hydro-mechanical transmission according to claim 1 wherein the hydraulic pump has a smaller cross sectional area of fluid under pressure than the hydraulic motor.

4. A hydro-mechanical transmission according to claim 1 wherein the hydraulic coupling means comprises;

a first non-restrictive primary fluid flow crossover path connecting the pump outlet to the motor inlet;

a second non-restrictive primary fluid flow crossover path connecting the motor outlet to the pump inlet;

a mode select assembly comprising;

a first and second non-return valve hydraulically situated in a back-to-back configuration to shunt hydraulic fluid in said primary fluid flow crossover paths in either direction by means of a shunt path between the two primary fluid flow crossover paths;

and a shuttle-stop valve lying in the shunt path between the non-return valves.

5. A hydro-mechanical transmission according to claim 4 wherein each non-return valve comprises a first fluid path and a second fluid path, a ball, a valve chamber, a spring, a ball valve seat, and a ball lifter mechanism, wherein;

the ball is located within the valve chamber biased onto the ball valve seat at one end of the valve chamber by the spring thereby preventing fluid flow through said ball valve seat;

the ball lifter mechanism is arranged so that it is externally controllable, and able to hold the ball unseated by acting in opposition to the spring thereby allowing fluid flow through the ball valve;

the first fluid path enters the valve chamber at an end opposite the ball valve seat and the second fluid path enters the valve chamber at the ball valve seat.

6. A hydro-mechanical transmission according to claim 4 wherein the shuttle-stop valve comprises a first fluid path and a second fluid path, a shuttle-stop valve chamber, a low volume fluid path, a first valve seat and a second valve seat, a first compression spring and a second compression spring, and a valve piston, wherein;

the first fluid path connects at one end to the first fluid path of the first non-return valve and connects to the shuttle-stop valve chamber at its other end;

the second fluid path connects at one end to the first fluid path of the second non-return valve and connects to the shuttle-stop valve chamber at its other end;

the first and second fluid paths enter the shuttle-stop valve chamber at opposite ends from each other;

the first and second valve seats are located within the shuttle-stop valve chamber adjacent the first and second fluid paths respectively to control fluid flow into and out of the shuttle-stop valve chamber;

the first and second compression springs are located within the shuttle-stop valve chamber inwardly of and adjacent to the first and second valve seats respectively;

the valve piston lies between the first and second compression springs biased away from both valve seats by the compression springs;

the low volume fluid path through the shuttle-stop valve from the first fluid path and to the second fluid path thereby permitting at low flow volumes unrestricted fluid flow in both directions over the valve piston from the first fluid path to the second fluid path, and thereby causing at higher flow volumes the piston valve to be biased into a seated position at the end of the shuttle-stop valve chamber in the direction of flow thereby shutting off fluid flow completely.

7. A hydro-mechanical transmission according to claim 4 wherein the transmission mode selector mechanism for operator selection of forward, reverse and neutral modes includes a forward/reverse selector linkage comprising a fixed housing, an inner sliding member, an upper and lower trunnion, pivotal connecting means, an inner sliding member, an input lever, and a laterally movable output shaft wherein;

the fixed housing is fixed to the transmission casing enclosing the input lever, the output shaft, and inner sliding member, said input lever being located within the housing pivotally connected to the laterally movable output shaft and the inner sliding member and having the upper trunnion and the lower trunnion each being fixed to said input lever by pivotal connecting means, the inner sliding member being free to move generally upwards and downwards within the housing and having trunnion cutouts at each of an upper and a lower end which may be selectably engaged with said upper trunnion for forward operation, with said lower trunnion for reverse operation, and with both trunnions for neutral operation.

8. A hydro-mechanical transmission according to claim 7 wherein the transmission mode selector mechanism includes a mode select slider comprising an elongate member having cams which are in contact with cam followers on the ball lifter mechanisms which control the non-return valves, said mode select slider being laterally positionable between a forward mode position wherein said cams are arranged to hold unseated one of said non-return valves, a rearward mode position wherein said cams are arranged to hold unseated the other of said non-return valves, and a neutral mode position wherein said cams are arranged to hold both non-return valves unseated.

9. A hydro-mechanical transmission according to claim 8 wherein the transmission mode selector mechanism includes a mode select linkage comprising a push pull cable, and five interconnected links, a master link, a first and second intermediate link, an forward/reverse selector link, and a mode select connector link, wherein;

the push pull cable is connected to an operator controlled device at one end, and is connected by pivotal means to one end of the master link at its other end;

the master link is an elongate member pivotally fixed to the transmission housing at a point between its two ends, and is fixed to the push pull cable at one end and to the first and second intermediate link at its opposite end;

the first intermediate link is an elongate member pivotally linked to the master link at one end and to the forward/reverse selector link at the other;

the second intermediate link is an elongate member pivotally linked to the master link at one end and to the mode select connector link at the other;

the forward/reverse selector link is an elongate member pivotally connected to the first intermediate link at one end and to the pins on each side of the forward\reverse selector at the other end, and is pivotally fixed to the transmission housing at its center;

the mode select connector link is an elongate member pivotally connected to the second intermediate link at one end and to the mode select slider link at the other, and is pivotally fixed to the transmission housing at its center;

the links are of such shape and dimensions that the mode select slider linkage and the forward\reverse selector are simultaneously repositioned into the correct locations for forward, reverse, and neutral operation when the push pull cable is actuated by the operator.

10. A hydro-mechanical transmission according to claim 1 incorporating a ratio control mechanism being responsive to engine speed and comprising a speed sensor, a first linking means, a hydraulic servo actuator, a second linking means, a unidirectional spring dash pot, and transmission input mechanism wherein;

the speed sensor has an input gear meshed to and driven by a gear on the transmission input shaft and has an output collar capable of linear movement proportional to the speed of the input gear;

the first linking means link the speed sensor output collar to the hydraulic servo actuator input;

the hydraulic servo actuator has a selector valve capable of linear motion connected to the speed sensor output collar by the first linking means, linear motion of the selector valve is amplified and output by the hydraulic actuator as same direction linear motion of a piston connected to the second linking means;

the second linking means link the output rod of the hydraulic servo actuator to the unidirectional spring dash pot;

the unidirectional spring dash pot is connected to the second linking means at one end and to the transmission input mechanism at the other, such that said spring dash pot allows movement in the one direction;

transmission input mechanism is connected to the spring dash pot at one end and to the internal gear of the hydraulic pump, such that movement of the spring dash pot results in axial movement of the internal gear of the hydraulic pump.

11. A hydro-mechanical transmission according to claim 10 wherein the speed sensor comprises:

an external housing;

an input shaft extending through the external housing having an internal bore extending axially along and in from one end thereof, said input shaft being bearing mounted at each of its ends;

an input gear fixed to the rotatable input shaft to communicate rotation movement from the transmission input shaft to said input shaft;

an internal rotating housing being fixed to and about the rotatable input shaft and being arranged within the external housing;

a push rod arranged coaxial to the rotatable input shaft and being axially moveable and radially constrained within the internal bore, said push rod extending from said bore outwards through the external housing to a free end;

a compression plate arranged within the internal rotating housing and around the input shaft for rotation therewith, said compression plate being connected to the push rod for movement therewith;

a spring arranged around the push rod and between the compression plate and a side of the internal rotating housing for rotation therewith;

an output collar and end cap having a ball bearing connection mounted at the free end of the push rod;

a pair of integral angulated cam follower guides being spline mounted opposite one another on the rotatable input shaft for rotation therewith and within the internal rotating housing, said cam follower guides extending outwards from said shaft towards the compression plate;

a pair of flyweights being mounted opposite one another on the rotatable input shaft for rotation therewith such that rotation of said shaft will bias the flyweights outwards and away from said shaft;

and a cam follower mounted on each respective flyweight such that said cam followers engage the compression plate opposite the spring and are free to move over respective ones of the cam follower guides;

and wherein causing rotation of the input shaft biases the flyweights outwards and axially along the cam follower guides thereby causing the cam followers to press against the compression plate moving the compression plate and push rod outwards;

and wherein the flyweights are biased outwards and axially along the cam follower an amount proportional to a speed of rotation of the input shaft.

12. A hydro-mechanical transmission according to claim 10 wherein the hydraulic servo-actuator includes a shift control pump to supply pressurized fluid variable with transmission input speed connected to the selector valve for communication of the pressurized fluid therethrough.

13. A hydro-mechanical transmission according to claim 10 wherein the selector valve comprises;

a high pressure fluid input;

a low pressure fluid output to a reservoir;

a valve spool being an elongate member passing through a hole through the selector valve being sealed at each end and free to move axially in said hole and linked at one end to the output of the speed sensor such that the valve spool moves in tandem with the speed sensor output;

first and second annular valve recesses on the valve spool being spaced apart at points along said valve spool;

first and second fluid paths, the first fluid path leading from the high pressure fluid to the valve spool and a second fluid path leading from the low pressure fluid branching into two lines and connecting to the valve spool at locations on either side of and spaced from the first fluid path;

third and fourth fluid paths, connected to the valve spool from a side opposite to that of the first and second fluid paths;

a first range of positions aligning said valve spool such that the first annular recess will allow fluid to pass from the first fluid path to the third fluid path and the second annular recess will allow fluid in the fourth fluid path to flow to the second fluid path;

a second range of positions aligning said valve spool such that the second annular recess will allow fluid to pass from the first fluid path to the fourth fluid path and the first annular recess will allow fluid in the third fluid path to flow to the second fluid path.

14. A hydro-mechanical transmission according to claim 10 wherein the hydraulic actuator comprises of a hydraulic actuator chamber, a piston and rod arrangement, a return spring, a low volume bleed orifice wherein;

the hydraulic actuator chamber is closed at one end by a first sealed end plate with a return spring internal to said chamber and adjacent said end plate;

the piston and rod arrangement lies inside the hydraulic actuator chamber adjacent the return spring such that the rod projects outwards in a direction away from the spring through a second sealed end plate terminating externally to the hydraulic actuator chamber;

the hydraulic actuator chamber is connected to the third fluid path of the selector valve at a location adjacent the second end plate between the second end plate and the piston, and is connected to the fourth fluid path of the selector valve at a location adjacent the first end plate between the first end plate the piston, such that differential fluid pressure will cause the piston and rod to move axially producing linear output motion providing such hydraulic force as is requisite to operate the transmission input lever via linking means a low volume flow bleed orifice connects the third and fourth fluid paths at a point located between the shunt valve and the hydraulic actuator chamber, said bleed orifice serving to permit said actuator piston to return to the neutral position when high pressure fluid is not applied.

15. A hydro-mechanical transmission according to claim 10 wherein the unidirectional spring dash pot comprises;

an outer housing including a hollow member closed at one end and open at the other with flanges extending inwards at the open end and a threaded hole located generally centrally in the closed end;

an inner member fitting within the outer member being free to move axially within the outer member being held within by the flanges and being connected to the second linking means on its outside surface;

a compression spring lying within the outer housing between the closed end of the housing and the inner member;

an adjustable screw being located in the threaded hole and having a pivotal fixing means attached to it external to the housing which connects to the transmission input lever whereby said spring dash pot serves to permit movement of transmission input lever in the counter clockwise direction and to provide a countervailing force thereto.

16. A hydro-mechanical transmission according to claim 10 wherein the transmission input mechanism comprises;

a transmission input lever having alternately selectable pivot points corresponding to forward and reverse vehicle ranges is connected to the unidirectional spring dash pot by pivotal fixing means at one end and to an input control yoke at the other;

an input control yoke incorporating an splined shaft protruding through the side of the transmission housing splinally connected to the transmission input lever, and being pivotally mounted within the transmission housing such that rotation of said yoke within defined limits will result in and thereby the pump internal gear being repositioned axially, thereby effecting a change in transmission output ratio.

17. A hydro-mechanical transmission according to claim 12 wherein the shift control pump being located inside the transmission housing and immersed in hydraulic fluid comprises a miniaturized gear type pump, an external gear, and a pressure relief valve wherein;

the miniaturized gear type pump includes an internal gear, an outer ring gear and a crescent that separates the respective internal gear and outer ring gear, said gear type pump transfers the fluid to a fluid flow outlet connected to external hydraulic piping, which directs the fluid to the hydraulic servo actuator;

the external gear is meshed with and powered by a gear on the transmission input shaft;

the external and internal gear are fixed to and spaced apart along a rotatable shaft;

the pressure relief valve directs excess pressurized fluid flow to the transmission housing.

18. A hydro-mechanical transmission according to claim 10 including a electrically activated kickdown solenoid connected to the selector valve at an end opposite the first linking means and to an operator selectable activating means, such that activation of the operator selectable activating means causes movement of the selector valve in the second range thereby causing the selector valve to change the high pressure fluid flow path reversing the hydraulic servo actuator output resulting in transmission downshifting.

19. A hydro-mechanical transmission according to claim 14 having a hydraulic servo actuator override comprising a shunt valve and an electrically activated shunt solenoid wherein;

the shunt valve is located between the selector valve and hydraulic actuator chamber in line with the third and fourth fluid paths exiting the selector valve, the shunt valve being an elongate member passing through a hole through the hydraulic actuator being sealed at each end and free to move axially in said hole and being connected to the electrical shunt solenoid at the one end and having two annular valve recesses a first and a second spaced apart which allow fluid to pass, the electrically activated shunt solenoid connects to the shunt valve at one end and is actuated by a micro switch connected to the mode select linkage arranged to be closed when the mode select linkage is in the neutral position;

the first annular valve recess is of a size large enough to connect the third fluid path to the fourth fluid path;

the first valve recess when the electrical shunt solenoid is not actuated is in line with the third fluid path and the second annular valve recess is positioned in line with the fourth fluid path, allowing fluid to flow across the shunt valve to the hydraulic actuator chamber;

the first annular valve recess when the electrical shunt solenoid is actuated is in line with both the third and fourth fluid paths thereby shunting fluid between the third and fourth fluid paths from the high pressure source to the low pressure reservoir bypassing the hydraulic actuator chamber.

20. A hydro-mechanical transmission according to claim 1 having a ratio trim control comprising an electric trim actuator, and a compound lever wherein;

the electric trim actuator is reversible and has a rotatable electric motor and an output screwshaft connected to the compound lever at said output screw such that the compound lever will be repositioned in either a forward or backward direction when the trim actuator is activated by means of an operator selectable toggle switch;

the compound lever includes two arms, and a common pivot point, the two arms of the compound lever include a leaf spring located such that rotational movement of the arms relative to one another is opposed in one direction by said spring, one arm of the compound lever is connectably linked by means of a nut mounted on the output screwshaft of the electric trim actuator, the second arm is held in position against the output collar of the engine speed sensor, the arms are arranged so that movement of the arm in contact with the speed sensor is opposed by the spring in a direction of increasing speed sensor output, resulting in a transmission output ratio reduction of such magnitude as selected by the operator.

* * * * *